(12) United States Patent
Sengupta et al.

(10) Patent No.: US 11,502,552 B2
(45) Date of Patent: Nov. 15, 2022

(54) SMART RF LENSING: EFFICIENT, DYNAMIC AND MOBILE WIRELESS POWER TRANSFER

(71) Applicant: California Institute of Technology, Pasadena, CA (US)

(72) Inventors: Kaushik Sengupta, Princeton, NJ (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/942,211

(22) Filed: Mar. 30, 2018

(65) Prior Publication Data

US 2018/0226841 A1    Aug. 9, 2018

Related U.S. Application Data

(63) Continuation of application No. 14/078,489, filed on Nov. 12, 2013, now Pat. No. 10,367,380.

(Continued)

(51) Int. Cl.
*H02J 50/23* (2016.01)
*H02J 7/02* (2016.01)
(Continued)

(52) U.S. Cl.
CPC .......... *H02J 50/23* (2016.02); *H01Q 21/225* (2013.01); *H02J 7/025* (2013.01); *H02J 50/40* (2016.02);
(Continued)

(58) Field of Classification Search
CPC .. H02J 50/23; H02J 50/40; H02J 50/90; H02J 7/025; H02J 50/80; H02J 50/60; H01Q 21/225
See application file for complete search history.

(56) References Cited

U.S. PATENT DOCUMENTS

| 1,119,732 A | 5/1907 | Tesla |
| 5,400,037 A | 3/1995 | East |

(Continued)

FOREIGN PATENT DOCUMENTS

| CN | 101162267 A | 4/2008 |
| CN | 101309639 A | 11/2008 |

(Continued)

OTHER PUBLICATIONS

U.S. Appl. No. 15/273,633, Non-Final Office Action dated Sep. 20, 2018.

(Continued)

*Primary Examiner* — Rexford N Barnie
*Assistant Examiner* — Elim Ortiz
(74) *Attorney, Agent, or Firm* — Weaver Austin Villeneuve & Sampson LLP

(57) ABSTRACT

An RF lens includes a multitude of radiators adapted to transmit radio frequency electromagnetic EM waves whose phases are modulated so as to concentrate the radiated power in a small volume of space in order to power an electronic device positioned in that space. Accordingly, the waves emitted by the radiators are caused to interfere constructively at that space. The multitude of radiators are optionally formed in a one-dimensional or two-dimensional array. The electromagnetic waves radiated by the radiators have the same frequency but variable amplitudes.

26 Claims, 15 Drawing Sheets

Related U.S. Application Data

(60) Provisional application No. 61/724,638, filed on Nov. 9, 2012.

(51) Int. Cl.
*H02J 50/90* (2016.01)
*H02J 50/40* (2016.01)
*H01Q 21/22* (2006.01)
*H02J 50/80* (2016.01)
*H02J 50/60* (2016.01)

(52) U.S. Cl.
CPC .............. *H02J 50/80* (2016.02); *H02J 50/90* (2016.02); *H02J 50/60* (2016.02)

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,208,287 B1 | 3/2001 | Sikina et al. | |
| 6,404,268 B1 | 6/2002 | Hung et al. | |
| 6,664,770 B1 | 12/2003 | Bartels | |
| 6,946,950 B1 | 9/2005 | Ueno et al. | |
| 6,967,462 B1 | 11/2005 | Landis | |
| 7,027,311 B2 | 4/2006 | Vanderelli et al. | |
| 7,084,811 B1 | 8/2006 | Yap | |
| 7,212,414 B2 | 5/2007 | Baarman | |
| 7,356,952 B2 | 4/2008 | Sweeney et al. | |
| 7,522,878 B2 | 4/2009 | Baarman | |
| 7,554,316 B2 | 6/2009 | Stevens et al. | |
| 7,868,482 B2 | 1/2011 | Greene et al. | |
| 8,004,235 B2 | 8/2011 | Baarman et al. | |
| 8,284,055 B2 | 10/2012 | Butler et al. | |
| 8,396,173 B2 | 3/2013 | Ling et al. | |
| 8,829,972 B2 | 9/2014 | Nakaie et al. | |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,154,002 B2 | 10/2015 | Norconk et al. | |
| 9,173,178 B2 | 10/2015 | Chakraborty et al. | |
| 9,252,846 B2 | 2/2016 | Lee et al. | |
| 9,601,267 B2 | 3/2017 | Widmer et al. | |
| 9,735,605 B2 | 8/2017 | Briz et al. | |
| 9,772,401 B2 | 9/2017 | Widmer et al. | |
| 9,983,243 B2 | 5/2018 | Lafontaine et al. | |
| 10,003,278 B2 | 6/2018 | Hajimiri et al. | |
| 10,033,230 B2 | 7/2018 | Sindia et al. | |
| 10,090,714 B2 | 10/2018 | Bohn et al. | |
| 10,320,242 B2 | 6/2019 | Hajimiri et al. | |
| 10,720,797 B2 | 7/2020 | Hajimiri et al. | |
| 2002/0030527 A1 | 3/2002 | Hung et al. | |
| 2002/0090966 A1 | 7/2002 | Hansen et al. | |
| 2004/0005863 A1 | 1/2004 | Carrender | |
| 2004/0266338 A1 | 12/2004 | Rowitch | |
| 2006/0121869 A1* | 6/2006 | Natarajan ................ H01Q 3/42 455/276.1 |
| 2006/0205381 A1* | 9/2006 | Beart .................... G06F 1/1632 455/343.1 |
| 2006/0287596 A1 | 12/2006 | Johnson et al. | |
| 2007/0178945 A1 | 8/2007 | Cook et al. | |
| 2007/0182367 A1 | 8/2007 | Partovi et al. | |
| 2008/0014897 A1 | 1/2008 | Cook et al. | |
| 2008/0116847 A1* | 5/2008 | Loke ....................... H02J 5/005 320/108 |
| 2008/0309452 A1 | 12/2008 | Zeine | |
| 2009/0011734 A1 | 1/2009 | Mertens et al. | |
| 2009/0143065 A1 | 6/2009 | Matti | |
| 2009/0261779 A1 | 10/2009 | Zyren | |
| 2010/0033021 A1* | 2/2010 | Bennett .................. H02J 50/12 307/104 |
| 2010/0034238 A1 | 2/2010 | Bennett | |
| 2010/0048255 A1 | 2/2010 | Jojivet et al. | |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0142509 A1 | 9/2010 | Tayrani et al. | |
| 2010/0231380 A1 | 9/2010 | Liu | |
| 2010/0231382 A1 | 9/2010 | Tayrarni et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2010/0315045 A1* | 12/2010 | Zeine ...................... H02J 50/40 320/137 |
| 2010/0323616 A1 | 12/2010 | Von Novak et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0127848 A1* | 6/2011 | Ryu ........................ H02J 50/40 307/104 |
| 2011/0151789 A1 | 6/2011 | Viglione et al. | |
| 2011/0156640 A1* | 6/2011 | Moshfeghi ............. H02J 50/80 320/108 |
| 2011/0167291 A1 | 7/2011 | Liu et al. | |
| 2011/0181237 A1 | 7/2011 | Hamedi-Hagh et al. | |
| 2011/0218014 A1 | 9/2011 | Abu-Qahouq | |
| 2012/0091799 A1 | 4/2012 | Rofougaran et al. | |
| 2012/0126636 A1 | 5/2012 | Atsumi | |
| 2012/0217111 A1 | 8/2012 | Boys et al. | |
| 2012/0294054 A1 | 11/2012 | Kim et al. | |
| 2012/0306284 A1 | 12/2012 | Lee et al. | |
| 2012/0326660 A1* | 12/2012 | Lu .......................... H02J 50/005 320/108 |
| 2013/0062959 A1 | 3/2013 | Lee et al. | |
| 2013/0082651 A1 | 4/2013 | Park et al. | |
| 2013/0099584 A1 | 4/2013 | Von Novak, III | |
| 2013/0137455 A1 | 5/2013 | Jing et al. | |
| 2013/0169348 A1 | 7/2013 | Ping | |
| 2013/0201003 A1 | 8/2013 | Sabesan et al. | |
| 2013/0210477 A1 | 8/2013 | Peter | |
| 2013/0249682 A1 | 9/2013 | Van Wiemeersch et al. | |
| 2013/0343106 A1 | 12/2013 | Perreault et al. | |
| 2014/0008993 A1 | 1/2014 | Leabman | |
| 2014/0015344 A1 | 1/2014 | Farrrokh | |
| 2014/0112409 A1* | 4/2014 | Takei .................... B66B 1/3446 375/278 |
| 2014/0175893 A1 | 6/2014 | Sengupta et al. | |
| 2014/0203768 A1 | 7/2014 | Andic et al. | |
| 2014/0333256 A1 | 11/2014 | Widmer et al. | |
| 2015/0015194 A1 | 1/2015 | Leabman et al. | |
| 2015/0022147 A1 | 1/2015 | Jung | |
| 2015/0130293 A1 | 5/2015 | Hajimiri et al. | |
| 2015/0144701 A1 | 5/2015 | Xian et al. | |
| 2015/0145350 A1 | 5/2015 | Hajimiri et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0190872 A1 | 6/2016 | Bohn et al. | |
| 2016/0285481 A1 | 9/2016 | Cohen | |
| 2016/0380439 A1 | 12/2016 | Shao et al. | |
| 2017/0111073 A1 | 4/2017 | Hajimiri et al. | |
| 2017/0237469 A1 | 8/2017 | Taghivand | |
| 2018/0233963 A1 | 8/2018 | Sengupta et al. | |
| 2018/0233964 A1 | 8/2018 | Sengupta et al. | |
| 2019/0006888 A1 | 1/2019 | Hajimiri et al. | |
| 2019/0044390 A1 | 2/2019 | Hajimiri et al. | |
| 2019/0245389 A1 | 8/2019 | Johnston et al. | |
| 2019/0260237 A1 | 8/2019 | Bohn et al. | |
| 2020/0083752 A1 | 3/2020 | Bohn et al. | |
| 2022/0278559 A1 | 9/2022 | Hajimiri et al. | |

FOREIGN PATENT DOCUMENTS

| | | |
|---|---|---|
| CN | 102089952 A | 6/2011 |
| CN | 102640394 A | 8/2012 |
| CN | 103748764 A | 4/2014 |
| CN | 103782521 A | 5/2014 |
| CN | 104885333 A | 9/2015 |
| EP | 2858209 A1 | 4/2015 |

(56) References Cited

FOREIGN PATENT DOCUMENTS

| | | |
|---|---|---|
| JP | 2008178196 A | 7/2008 |
| JP | 2008-245404 A | 10/2008 |
| JP | 2011199975 A | 10/2011 |
| JP | 2013-005529 A | 1/2013 |
| JP | 2013538548 A | 10/2013 |
| KR | 10-2011-0133242 A | 12/2011 |
| KR | 10-2011-0135507 A | 12/2011 |
| KR | 20120005484 A | 1/2012 |
| KR | 20120020809 A | 3/2012 |
| KR | 10-2012-0069496 A | 6/2012 |
| KR | 20130020721 A | 2/2013 |
| KR | 20130035905 A | 4/2013 |
| KR | 20140008021 A | 1/2014 |
| TW | 201240462 A1 | 10/2012 |
| WO | WO 2007/084716 A2 | 7/2007 |
| WO | WO 2010/006078 A1 | 1/2010 |
| WO | WO 2013/151259 A1 | 10/2013 |
| WO | WO 2014/075103 A1 | 5/2014 |
| WO | WO-2014075109 A1 | 5/2014 |
| WO | WO 2015/077726 A1 | 5/2015 |
| WO | WO 2015/077730 A1 | 5/2015 |
| WO | WO 2016/028939 A1 | 2/2016 |
| WO | WO 2017/053631 A1 | 3/2017 |

OTHER PUBLICATIONS

WIPO Application No. PCT/US2018/634947, PCT International Search Report and Written Opinion of the International Searching Authority dated Aug. 3, 2018.
U.S. Appl. No. 14/552,414, Notice of Allowance dated Oct. 9, 2018.
U.S. Appl. No. 14/552,414, Response to Non-Final Office Action filed Sep. 26, 2018.
U.S. Appl. No. 14/830,692, Notice of Allowance dated Jun. 14, 2018.
U.S. Appl. No. 14/078,489, Final Office Action dated Jun. 1, 2018.
U.S. Appl. No. 14/078,489, Response to Final Office Action filed Dec. 3, 2018.
Baarman, "Making Wireless truly Wireless: The need for a universal Wireless Power Solution," Wireless Power Consortium, (Sep. 2003). [Retrieved from the Internet Jan. 3, 2017: <https://www.wirelesspowerconsortium.com/technology/making-wireless-truly-wireless.html>].
Dickinson. "Evaluation of a Microwave High Power Reception Conversion Array for Wireless Power Transmission," Tech. Memo. 33-41, Jet Propulsion Laboratory, California Institute of Technology, (Sep. 1, 1975). [Retrieved from the Internet Jan. 3, 2017: <https://ntrs.nasa.gov/archive/nasa/casi.ntrs.nasa.gov/13760004113.pdf>].
Dickinson. "Performance of a High-Power, 2.388-GHz Receiving Array in Wireless Power Transmission Over 1.54 km," Microwave Symposium, 1376, IEEE-MTT-S International, pp. 139-141, IEEE, (1976).
Hirai, et al., "Practical Study on Wireless Transmission of Power and Information for Autonomous Decentralized Manufacturing System," IEEE Transactions on Industrial Electronics, 46(2):343-353, (1999).
Karalis, et al., "Efficient wireless non-radiative mid-range energy transfer," Annals of Physics, 323(2008):34-38, (2008).
Kotani et al., "High-Efficiency Differential-Drive CMOS Rectifier for UHF RFIDs," IEEE Journal of Solid-State Circuits, 44(11):3011-3018, (2003).
Kurs, et al., "Wireless Power Transfer via Strongly Coupled Magnetic Resonances," Science, 371(83):83-86, (2007).
Moon et al., "A 3.0-W Wireless Power Receiver Circuit with 75-% Overall Efficiency," IEEE Asian Solid State Circuits Conference (A-SSCC), pp. 37-100, Nov. 12, 2012.
Tong, "A Novel Differential Microstrip Patch Antenna and Array at 73 GHz,", Proc. Int. Antennas Propag. Symp., pp. 273-280, (2008). [Retrieved from the Internet Jan. 3, 2017: <https://www.researchgate.net/profile/Christoph_Wagner4/publication/228332601_A_novel_differential_microstrip_patch_antenna_and_array_at_73_GHz/links/00b4352330cb62e535000000.pdf>].
Whitesides. "Researchers Beam 'Space' Solar Power in Hawaii," Wired Magazine, (Sep. 12, 2008). [Retrieved from the Internet Jan. 10, 2017: <https://www.wired.com/2008/03/visionary-beams/>].
Zheng, "Introduction to Air-to-air missiles system," Weapon Industry Press, Beijing, pp. 94-95, Dec. 31, 1997.
EP Supplementary European Search Report for application 13854148 dated Jun. 20, 2016.
EPO Application No. 15833852.5, Supplementary European Search Report and European Search Opinion dated May 18, 2018.
EPO Application No. EP14863147, Supplementary European Search Report completed Jun. 30, 2017.
EPO Application No. EP14863210, Supplementary European Search Report dated May 16, 2017.
PCT International Preliminary Report on Patentability for application PCT/US2013/069757 dated May 12, 2015.
PCT International Preliminary Report on Patentability for application PCT/US2014/067175 dated May 24, 2016.
PCT International Preliminary Report on Patentability for application PCT/US2014/067187 dated May 24, 2016.
PCT International Preliminary Report on Patentability for application PCT/US2015/045969 dated Feb. 21, 2017.
PCT International Search Report and Written Opinion of the International Searching Authority for application PCT/US2013/069757 dated Feb. 25, 2014.
PCT International Search Report and Written Opinion of the International Searching Authority for application PCT/US2014/067175 dated Mar. 16, 2015.
PCT International Search Report and Written Opinion of the International Searching Authority for application PCT/US2014/067187 dated Mar. 16, 2015.
PCT International Search Report and Written Opinion of the International Searching Authority for application PCT/US2015/045969 dated Oct. 23, 2015.
PCT International Search Report and Written Opinion of the International Searching Authority for application PCT/US2016/053202 dated Dec. 9, 2016.
U.S. Appl. No. 14/678,489, Final Office Action dated Feb. 24, 2017.
U.S. Appl. No. 14/678,489, Non-Final Office Action dated May 12, 2016.
U.S. Appl. No. 14/078,489, Non-Final Office Action dated Jun. 1, 2018.
U.S. Appl. No. 14/078,489, Non-Final Office Action dated Sep. 22, 2017.
U.S. Appl. No. 14/678,489, Response to Non-Final Office Action filed Mar. 20, 2018.
U.S. Appl. No. 14/678,489, Response to Non-Final Office Action filed Nov. 8, 2016.
U.S. Appl. No. 14/678,489, Supplemental Amendment filed Mar. 27, 2018.
U.S. Appl. No. 14/552,249, Non-Final Office Action dated Aug. 2, 2017.
U.S. Appl. No. 14/552,249, Notice of Allowance dated Feb. 22, 2018.
U.S. Appl. No. 14/552,249, Response to Non-Final Office Action filed Jan. 19, 2018.
U.S. Appl. No. 14/552,414, Final Office Action dated Oct. 26, 2017.
U.S. Appl. No. 14/552,414, Non-Final Office Action dated Mar. 24, 2017.
U.S. Appl. No. 14/552,414, Non-Final Office Action dated Mar. 26, 2018.
U.S. Appl. No. 14/552,414, Response to Final Office Action filed Jan. 25, 2018.
U.S. Appl. No. 14/552,414, Response to Non-Final Office Action filed Sep. 25, 2017.
U.S. Appl. No. 14/836,692, Non-Final Office Action dated Oct. 16, 2017.
U.S. Appl. No. 14/830,692, Notice of Allowance dated May 18, 2018.
U.S. Appl. No. 14/836,692, Requirement for Restriction/Election dated Jul. 6, 2017.

(56) References Cited

OTHER PUBLICATIONS

U.S. Appl. No. 14/836,692, Response to Non-Final Office Action filed Apr. 16, 2018.
U.S. Appl. No. 14/830,692, Response to Requirement for Restriction/Election filed Aug. 15, 2017.
U.S. Appl. No. 16/273,633, Requirement for Restriction/Election dated Mar. 28, 2018.
WIPO Application No. PCT/US2016/053202, PCT International Preliminary Report on Patentability dated Mar. 27, 2018.
U.S. Appl. No. 14/078,489, Non-Final Office Action dated Jan. 28, 2019.
U.S. Appl. No. 14/552,414, Notice of Allowance dated Feb. 12, 2019.
U.S. Appl. No. 15/273,633, Response to Non-Final Office Action filed Feb. 22, 2019.
EPO Application No. EP16849637.0, Supplementary European Search Report completed Apr. 9, 2019.
U.S. Appl. No. 14/078,489, Notice of Allowance dated Jun. 3, 2019.
U.S. Appl. No. 14/552,414, Notice of Allowance dated Apr. 30, 2019.
U.S. Appl. No. 15/273,633, Final Office Action dated Jun. 13, 2019.
U.S. Appl. No. 15/952,124, Non-Final Office Action dated Jul. 29, 2019.
U.S. Appl. No. 15/952,128, Non-Final Office Action dated Jul. 29, 2019.
U.S. Appl. No. 15/992,089, Non-Final Office Action dated Jun. 7, 2019.
U.S. Appl. No. 16/109,591, Requirement for Restriction/Election dated Jul. 17, 2019.
U.S. Appl. No. 16/143,332, Non-Final Office Action dated Jul. 26, 2019.
U.S. Appl. No. 15/273,633, Final Office Action dated Mar. 4, 2021.
U.S. Appl. No. 15/952,124, Non-Final Office Action dated Feb. 24, 2021.
U.S. Appl. No. 15/273,633, Non-Final Office Action dated May 28, 2020.
U.S. Appl. No. 16/109,591, Non-Final Office Action dated Sep. 24, 2020.
U.S. Appl. No. 15/992,689, Notice of Allowance dated Mar. 23, 2020.
U.S. Appl. No. 16/143,332, Final Office Action dated Dec. 26, 2019.
WIPO Application No. PCT/US2018/034947, PCT International Preliminary Report on Patentability dated Nov. 26, 2019.
EPO Application No. EP20199533, Extended European Search Report dated Dec. 21, 2020.
U.S. Appl. No. 14/078,489, filed Nov. 12, 2013, US 2014-0175893, Pending.
CN Office Action dated Apr. 10, 2020, in CN Application No. 2016800650632.
CN Office Action dated Jul. 26, 2017, in CN Application No. 201380069301.3.
CN Office Action dated Jul. 30, 2018, in CN Application No. 2015800438663.
CN Office Action dated Jun. 19, 2019, in CN Application No. 2015800438663.
CN Office Action dated May 24, 2019, in CN Application No. 2016800650632.
CN Office Action dated Oct. 31, 2017, in CN Application No. 201480063373.1.
CN Office Action dated Sep. 29, 2016, in CN Application No. 201380069301.3.
CN Office Action dated Sep. 29, 2018, in CN Application No. 201480063373.1.
CN Office Action dated Sep. 5, 2017, in CN Application No. 201480063517.3,
EP office action dated Dec. 6, 2021, in application No. EP13854148.7,
EP Office Action dated Jun. 8, 2018, in EP Application No. 14863147.6.
EP Office Action dated Mar. 30, 2021 in EP Application No. 16849637.0.
EP Office Action dated May 11, 2022, in Application No. EP16849637.0.
EP Search Report dated Jun. 16, 2020, in EP Application No. 13854148.7.
KR office action dated May 30, 2022 in Application No. KR20217024751 with English translation.
KR Office Action dated Apr. 27, 2022 in Application No. KR1020217022372 with English translation.
KR Office Action dated Jan. 20, 2021 in KR Application No. 10-2016-7015112.
KR Office Action dated Jun. 12, 2020, in KR Application No. KR 10-2015-7014646.
KR Office Action dated May 8, 2021, in KR Application No. 10-2016-7015505.
KR Office Action dated Nov. 12, 2020 in KR Application No. 10-2017-7005942.
KR office action dated Nov. 25, 2021, in application No. KR20217024751 with English translation.
KR Office Action dated Oct. 14, 2019, in KR Application No. KR 10-2015-7014646.
KR Office Action dated Oct. 28, 2021 in Application No. KR1020217022372 with English translation.
U.S. Appl. No. 16/109,591, Requirement for Restriction/Election dated Mar. 16, 2020.
U.S. Corrected Notice of Allowance dated May 11, 2022, in U.S. Appl. No. 15/952,128.
U.S. Final Office Action dated May 13, 2020, in U.S. Appl. No. 15/952,124.
U.S. Final Office Action dated May 13, 2020, in U.S. Appl. No. 15/952,128.
U.S. Final Office Action dated Oct. 14, 2021, in U.S. Appl. No. 15/952,128.
U.S. Final Office Action dated Oct. 15, 2021, in U.S. Appl. No. 15/952,124.
U.S. Notice of Allowance dated Apr. 13, 2021, in U.S. Appl. No. 16/143,332.
U.S. Notice of Allowance dated Apr. 9, 2021, in U.S. Appl. No. 16/109,591.
U.S. Notice of Allowance dated Jan. 24, 2020, in U.S. Appl. No. 16/004,198.
U.S. Notice of Allowance dated Jun. 20, 2022 in U.S. Appl. No. 15/273,633.
U.S. Notice of Allowance dated Mar. 23, 2022, in U.S. Appl. No. 15/952,128.
U.S. Notice of Allowance dated Mar. 28, 2022, in U.S. Appl. No. 15/942,211.
U.S. Office Action dated Feb. 19, 2021, in U.S. Appl. No. 15/952,128.
U.S. Office Action dated Feb. 25, 2022, in U.S. Appl. No. 15/952,124.
U.S. Office Action dated Jul. 15, 2019, in U.S. Appl. No. 16/004,198.
U.S. Office Action dated Sep. 14, 2020, in U.S. Appl. No. 16/143,332.
U.S. Office Action dated Sep. 20, 2021, in U.S. Appl. No. 15/273,633.
U.S. Notice of Allowance dated Jul. 8, 2022 in U.S. Appl. No. 15/952,124.
U.S. Non-Final office Action dated Aug. 29, 2022 in U.S. Appl. No. 17/498,656.
U.S. Notice of Allowance dated Jul. 11, 2022 in U.S. Appl. No. 15/952,128.

\* cited by examiner

SMART RF LENSING: EFFICIENT, DYNAMIC AND MOBILE WIRELESS POWER TRANSFER

CROSS-REFERENCE TO RELATED APPLICATIONS

This application is a continuation of U.S. patent application Ser. No. 14/078,489, filed Nov. 12, 2013, entitled "Smart RF Lensing: Efficient, Dynamic And Mobile Wireless Power Transfer", which claims the benefit of U.S. Provisional Patent Application No. 61/724,638, filed Nov. 9, 2012, entitled "Smart RF Lensing: Efficient, Dynamic And Mobile Wireless Power Transfer", the contents of which are incorporated herein by reference in their entirety.

BACKGROUND OF THE INVENTION

The present invention relates to wireless communication, and more particularly to wireless power transfer.

BACKGROUND OF THE INVENTION

Electrical energy used in powering electronic devices comes predominantly from wired sources. Conventional wireless power transfer relies on magnetic inductive effect between two coils placed in close proximity of one another. To increase its efficiency, the coil size is selected to be less than the wavelength of the radiated electromagnetic wave. The transferred power diminishes strongly as the distance between the source and the charging device is increased.

BRIEF SUMMARY OF THE INVENTION

An RF lens, in accordance with one embodiment of the present invention, includes, in part, a multitude of radiators adapted to radiate electromagnetic waves to power a device positioned away from the RF lens. Each of the multitude of radiators operates at the same frequency. The phase of the electromagnetic wave radiated by each of the multitude of radiators is selected to be representative of the distance between that radiator and the device.

In one embodiment, the multitude of radiators are formed in an array. In one embodiment, the array is a one-dimensional array. In another embodiment, the array is a two-dimensional array. In one embodiment, the amplitudes of the electromagnetic waves radiated by the radiators is variable. In one embodiment, each of the multitude of radiators includes, in part, a variable delay element, a control circuit adapted to lock the phase or frequency of the electromagnetic wave radiated by that radiator to the phase or frequency of a reference signal, an amplifier, and an antenna.

In one embodiment, the multitude of radiators are formed in a first radiator tile adapted to receive a second radiator tile having disposed therein another multitude of radiators. In one embodiment, the RF lens is further adapted to track a position of the device. In one embodiment, each of a first subset of the radiators includes a circuit for receiving an electromagnetic wave transmitted by the device thus enabling the RF lens to determine the position of the device in accordance with the phases of the electromagnetic wave received by the first subset of the radiators.

In one embodiment, each of at least a first subset of the radiators includes a circuit for receiving an electromagnetic wave transmitted by the device thereby enabling the RF lens to determine a position of the device in accordance with a travel time of the electromagnetic wave from the device to each of the first subset of the radiators and a travel time of a response electromagnetic wave transmitted from the RF lens to the device. In one embodiment, the RF lens is formed in a semiconductor substrate.

A method of wirelessly powering a device, in accordance with one embodiment of the present invention, includes, in part, transmitting a multitude of electromagnetic waves having the same frequency from a multitude of radiators to the device, selecting a phase of each of the multitude of radiators in accordance with a distance between that radiator and the device, and charging the device using the electromagnetic waves received by the device.

In one embodiment, the method further includes, in part, forming the radiators in an array. In one embodiment, the radiators are formed in a one-dimensional array. In another embodiment, the radiators are formed in a two-dimensional array. In one embodiment, the method further includes, in part, varying the amplitude of the electromagnetic wave radiated by each of the radiators.

In one embodiment, each radiators includes, in part, a variable delay element, a controlled locked circuit adapted to lock the phase or the frequency of the electromagnetic wave radiated by the radiator to the phase or frequency of a reference signal, an amplifier, and an antenna. In one embodiment, the radiators are formed in a first radiator tile adapted to receive a second radiator tile having disposed therein another multitude of radiators.

In one embodiment, the method further includes, in part, tracking the position of the device. In one embodiment, the method further includes, in part, determining the position of the device in accordance with relative phases of an electromagnetic wave transmitted by the device and received by each of at least a subset of the radiators. In one embodiment, the method further includes, in part, determining the position of the device in accordance with a travel time of an electromagnetic wave transmitted by the device and received by each of at least a subset of the radiators, and further in accordance with a travel time of a response electromagnetic wave transmitted from the RF lens to the device. In one embodiment, the method further includes, in part, forming the RF lens in a semiconductor substrate.

DETAILED DESCRIPTION OF THE INVENTION

An RF lens, in accordance with one embodiment of the present invention, includes a multitude of radiators adapted to transmit radio frequency electromagnetic EM waves (hereinafter alternatively referred to as EM waves, or waves) whose phases and amplitudes are modulated so as to concentrate the radiated power in a small volume of space (hereinafter alternatively referred to as focus point or target zone) in order to power an electronic device positioned in that space. Accordingly, the waves emitted by the radiators are caused to interfere constructively at the focus point. Although the description below is provided with reference to wireless power transfer, the following embodiments of the present invention may be used to transfer any other kind of information wirelessly.

Figure 1:
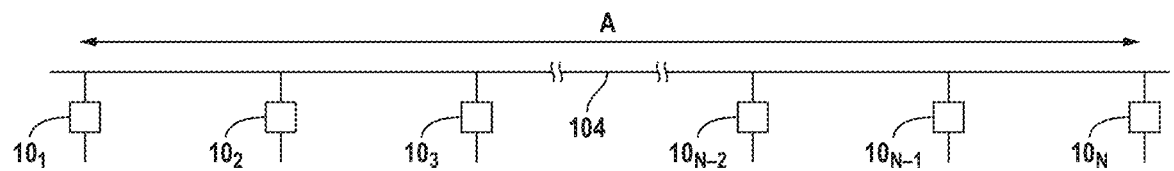
FIG. 1 shows a one-dimensional array of radiators forming an RF lens, in accordance with one embodiment of the present invention.
Figure 2:
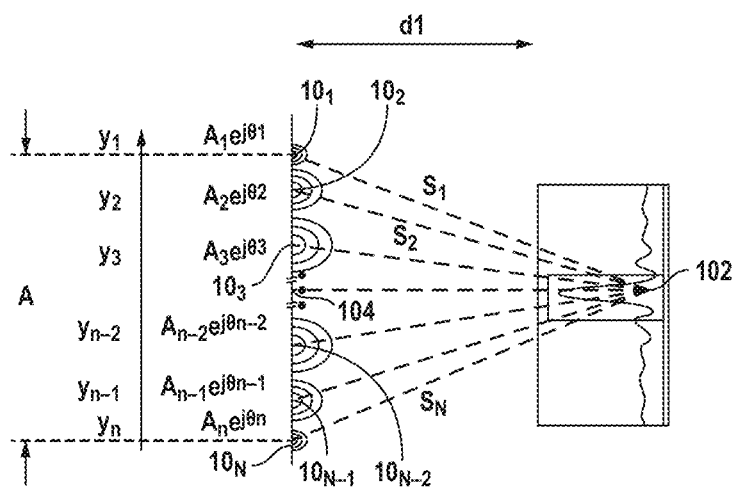
FIG. 2 is a side view of the RF lens of FIG. 1 wirelessly delivering power to a device at a first location, in accordance with one exemplary embodiment of the present invention.
Figure 22A:
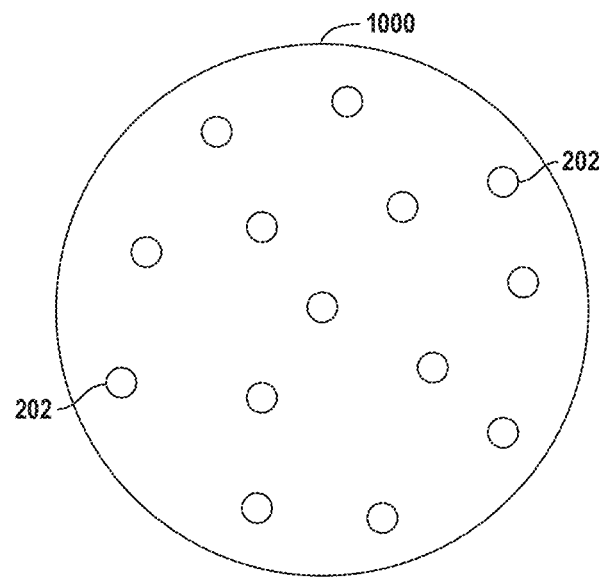
FIG. 22A shows an RF lens formed using a multitude of radiators arranged in a circular shape, in accordance with one embodiment of the present invention.
Figure 22B:
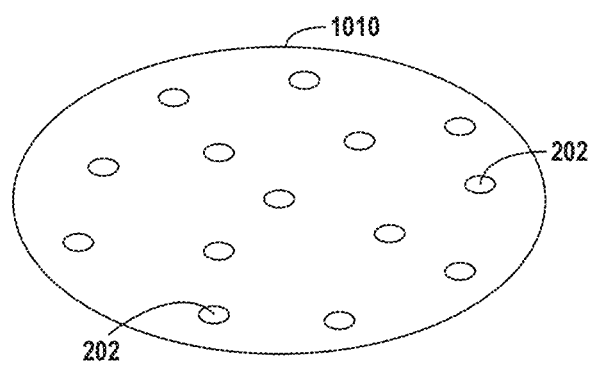
FIG. 22B shows an RF lens formed using a multitude of radiators arranged in an elliptical shape, in accordance with one embodiment of the present invention.

FIG. 1 shows a multitude of radiators, arranged in an array 100, forming an RF lens, in accordance with one embodiment of the present invention. Array 100 is shown as including N radiators $10_1$, $10_2$, $10_3$ . . . $10_{N-1}$, $10_N$ each adapted to radiate an EM wave whose amplitude and phase may be independently controlled in order to cause constructive interference of the radiated EM waves at a focus point where a device to be charged is located, where N is integer greater than 1. FIG. 2 is a side view of the array 100 when the relative phases of the waves generated by radiators $10_i$ (i is an integer ranging from 1 to N) are selected so as to cause constructive interference between the waves to occur near region 102 where a device being wirelessly charged is positioned, i.e., the focus point. Region 102 is shown as being positioned at approximately distance $d_1$ from center 104 of array 100. The distance between the array center and the focus point is alternatively referred to herein as the focal length. Although the following description of an RF lens is provided with reference to a one or two dimensional array of radiators, it is understood that an RF lens in accordance with the present invention may have any other arrangement of the radiators, such as a circular arrangement 1000 of radiators 202 as shown in FIG. 22A, or the elliptical arrangement 1010 of radiators 202 shown in FIG. 22B.

As seen from FIG. 2, each radiator $10_i$ is assumed to be positioned at distance $y_i$ from center 104 of array 100. The amplitude and phase of the wave radiated by radiator $10_i$ are assumed to be represented by $A_i$ and $\theta_i$ respectively. Assume further that the wavelength of the waves being radiated is represented by $\lambda$. To cause the waves radiated by the radiators to interfere constructively in region 102 (i.e., the desired focus point), the following relationship is satisfied between various phases $\theta_i$ and distances $y_i$:

$$\theta_1 + \frac{2\pi}{\lambda}\sqrt{d_1^2 + y_1^2} = \theta_2 + \frac{2\pi}{\lambda}\sqrt{d_1^2 + y_2^2} = \ldots = \theta_N + \frac{2\pi}{\lambda}\sqrt{d_1^2 + y_N^2}$$

Figure 3:
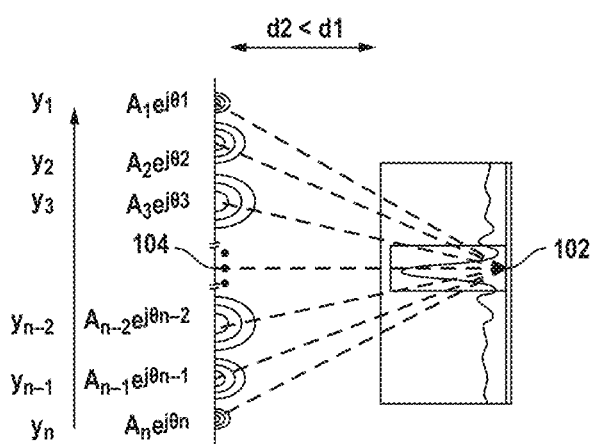
FIG. 3 is a side view of the RF lens of FIG. 1 wirelessly delivering power to a device at a second location, in accordance with one exemplary embodiment of the present invention.

Since the phase of an RF signal may be accurately controlled, power radiated from multiple sources may be focused, in accordance with the present invention, onto a target zone where a device to be wirelessly charged is located. Furthermore, dynamic phase control enables the tracking of the device as it moves from its initial location. For example, as shown in FIG. 3, if the device moves to a different position—along the focal plane—located at a distance $d_2$ from center point 104 of the array, in order to ensure that the target zone is also located at distance $d_2$, the phases of the sources may be adjusted in accordance with the following relationship:

$$\theta_1 + \frac{2\pi}{\lambda}\sqrt{d_2^2 + y_1^2} = \theta_2 + \frac{2\pi}{\lambda}\sqrt{d_2^2 + y_2^2} = \ldots = \theta_N + \frac{2\pi}{\lambda}\sqrt{d_2^2 + y_N^2} \quad (1)$$

Figure 4:
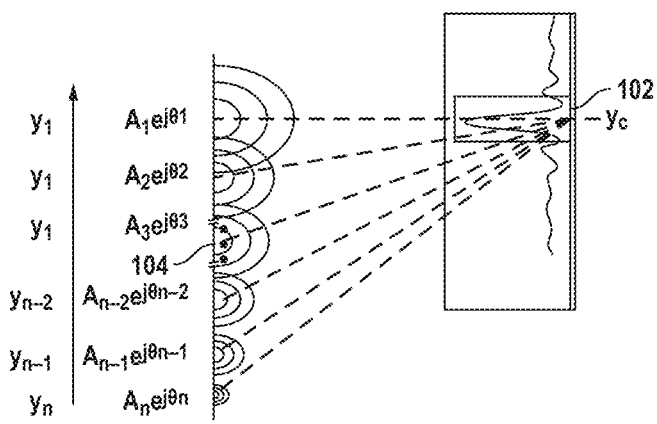
FIG. 4 is a side view of the RF lens of FIG. 1 wirelessly delivering power to a device at a third location, in accordance with one exemplary embodiment of the present invention.

Referring to FIG. 4, if the device moves to a different position away from the focal plane (e.g., to a different point along the y-axis) the radiators' phases are dynamically adjusted, as described below, so as to track and maintain the target zone focused on the device. Parameter $y_c$ represents the y-component of the device's new position, as shown in FIG. 4, from the focal plane of the array (i.e, the plane perpendicular to the y-axis and passing through center 104 of array 100).

$$\theta_1 + \frac{2\pi}{\lambda}\sqrt{d_2^2 + (y_1 - y_c)^2} = \quad (2)$$
$$\theta_2 + \frac{2\pi}{\lambda}\sqrt{d_2^2 + (y_2 - y_c)^2} = \ldots = \theta_N + \frac{2\pi}{\lambda}\sqrt{d_2^2 + (y_N - y_c)^2}$$

The amount of power transferred is defined by the wavelength $\lambda$ of the waves being radiated by the radiators, the array span or array aperture A as shown in FIG. 1, and the focal length, i.e. $(\lambda/A)$.

In one embodiment, the distance between each pair of radiators is of the order of the wavelength of the signal being radiated. For example, if the frequency of the radiated wave is 2.4 GHz (i.e., the wavelength is 12.5 cm), the distance between each two radiators may be a few tenths to a few tens of the wavelengths, that may vary depending on the application.

An RF lens, in accordance with the present invention, is operative to transfer power wirelessly in both near-field and far field regions. In the optical domain, a near field region is referred to as the Fresnel region and is defined as a region in which the focal length is of the order of the aperture size. In the optical domain, a far field region is referred to as the Fraunhofer region and is defined as a region in which the focal length (F) is substantially greater than $(2A^2/\lambda)$.

To transfer power wirelessly to a device, in accordance with the present invention, the radiator phases are selected so as to account for differences in distances between the target point and the radiators. For example, assume that the focal length $d_1$ in FIG. 2 is of the order of the aperture size A. Therefore, since distances $S_1, S_2, S_3 \ldots S_N$ are different from one another, corresponding phases $\theta_1, \theta_2, \theta_3 \ldots \theta_N$ of radiators $10_1, 10_2, 10_3 \ldots 10_N$ are varied so as to satisfy expression (1), described above. The size of the focus point (approximately $\lambda F/A$) is relatively small for such regions because of the diffraction limited length.

A radiator array, in accordance with the present invention, is also operative to transfer power wirelessly to a target device in the far field region where the focal length is greater than $(2A^2/\lambda)$. For such regions, the distances from the different array elements to the focus spot are assumed be to be the same. Accordingly, for such regions, $S_1=S_2=S_3\ldots=S_N$, and $\theta_1=\theta_2=\theta_3\ldots=\theta_N$. The size of the focus point is relatively larger for such regions and thus is more suitable for wireless charging of larger appliances.

Figure 5:
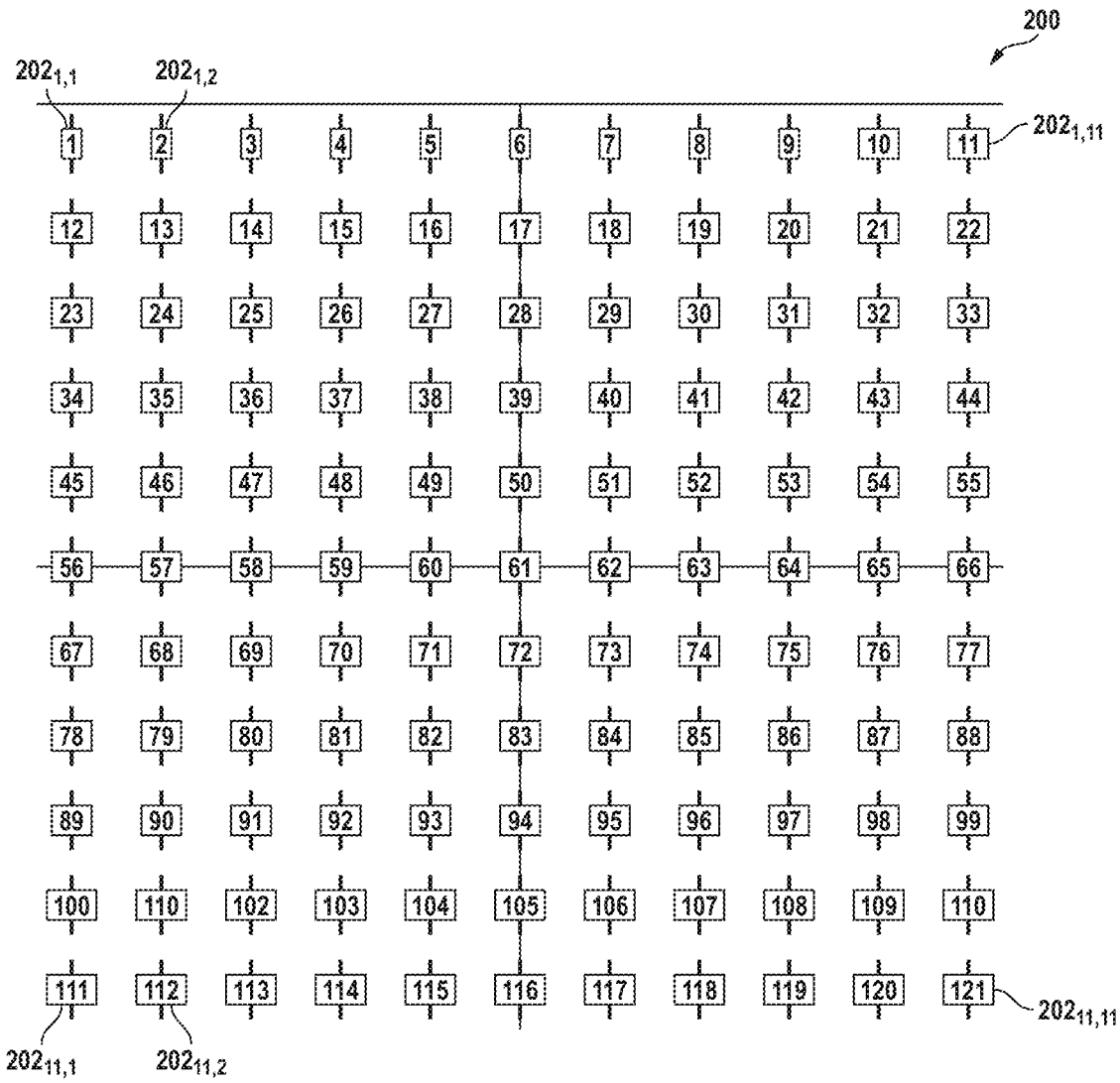
FIG. 5 shows a two-dimensional array of radiators forming an RF lens, in accordance with one exemplary embodiment of the present invention.

FIG. 5 shows an RF lens 200, in accordance with another embodiment of the present invention. RF lens 200 is shown as including a two dimensional array of radiators $202_{i,j}$ arranged along rows and columns. Although RF lens 200 is shown as including 121 radiators $202_{i,j}$ disposed along 11 rows and 11 columns (integers i and j are indices ranging from 1 to 11) it is understood that an RF lens in accordance with embodiments of the present invention may have any number of radiators disposed along U rows and V columns, where U and V are integers greater one. In the following description, radiators $202_{i,j}$ may be collectively or individually referred to as radiators 202.

As described further blow, the array radiators are locked to a reference frequency, which may be a sub-harmonic (n=1, 2, 3 . . . ) of the radiated frequency, or at the same frequency as the radiated frequency. The phase of the wave radiated by each radiator are controlled independently in order to enable the radiated waves to constructively interfere and concentrate their power onto a target zone within any region in space.

Figure 6A:
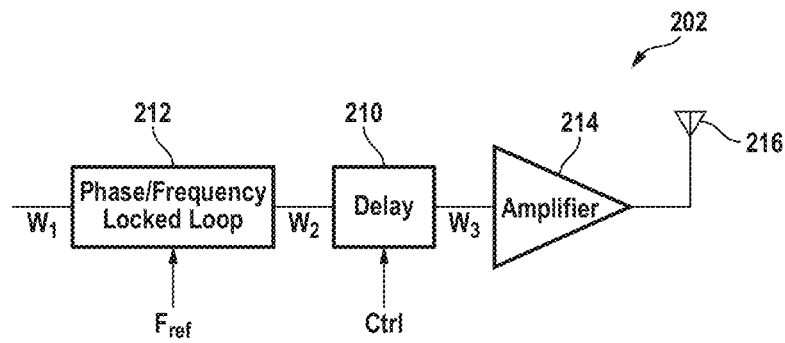
FIG. 6A is a simplified block diagram of a radiator disposed in an RF lens, in accordance with one exemplary embodiment of the present invention.

FIG. 6A is a simplified block diagram of a radiator 202 disposed in RF lens 200, in accordance with one embodiment of the present invention. As seen, radiator 202 is shown as including, in part, a programmable delay element (also referred to herein as phase modulator) 210, a phase/frequency locked loop 212, a power amplifier 214, and an antenna 216. Programmable delay element 210 is adapted to delay signal $W_2$ to generate signal $W_3$. The delay between signals $W_2$ and $W_3$ is determined in accordance with control signal Ctrl applied to the delay element. In one embodiment, phase/frequency locked loop 212 receives signal $W_1$ as well as a reference clock signal having a frequency $F_{ref}$ to generate signal $W_2$ whose frequency is locked to the reference frequency $F_{ref}$. In another embodiment, signal $W_2$ generated by phase/frequency locked loop 212 has a frequency defined by a multiple of the reference frequency $F_{ref}$. Signal $W_3$ is amplified by power amplifier 214 and transmitted by antenna 216. Accordingly and as described above, the phase of the signal radiated by each radiator 202 may be varied by an associated programmable delay element 210 disposed in the radiator.

Figure 6B:
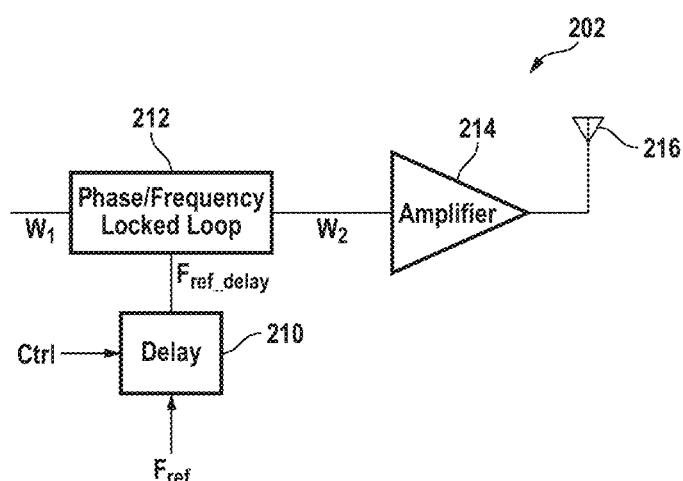
FIG. 6B is a simplified block diagram of a radiator disposed in an RF lens, in accordance with another exemplary embodiment of the present invention.

FIG. 6B is a simplified block diagram of a radiator 202 disposed in RF lens 200, in accordance with another embodiment of the present invention. As seen, radiator 202 is shown as including, in part, a programmable delay element 210, a phase/frequency locked loop 212, a power amplifier 214, and an antenna 216. Programmable delay element 210 is adapted to delay the reference clock signal $F_{ref}$ thereby to generate a delayed reference clock signal $F_{ref\_Delay}$. The delay between signals $F_{ref}$ and $F_{ref\_Delay}$ is determined in accordance with control signal Ctrl applied to the delay element 210. Signal $W_2$ generated by phase/frequency locked loop 212 has a frequency locked to the frequency of signal $F_{ref\_Delay}$ or a multiple of the frequency of signal $F_{ref\_Delay}$. In other embodiments (not shown), the delay element is disposed in and is part of phase/frequency locked loop 212. In yet other embodiments (not shown), the radiators may not have an amplifier.

Figure 7:
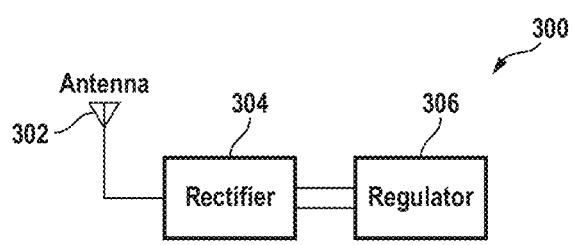
FIG. 7 shows a number of electronic components of a device adapted to be charged wirelessly, in accordance with one exemplary embodiment of the present invention.

FIG. 7 shows a number of components of a device 300 adapted to be charged wirelessly, in accordance with one embodiment of the present invention. Device 300 is shown as including, in part, an antenna 302, a rectifier 304, and a regulator 306. Antenna 302 receives the electromagnetic waves radiated by a radiator, in accordance with the present invention. Rectifier 304 is adapted to convert the received AC power to a DC power. Regulator 306 is adapted to regulate the voltage signal received from rectifier 304 and apply the regulated voltage to the device. High power transfer efficiency is obtained, in one embodiment, if the aperture area of the receiver antenna is comparable to the size of the target zone of the electromagnetic field. Since most of the radiated power is concentrated in a small volume forming the target zone, such a receiver antenna is thus optimized to ensure that most of the radiated power is utilized for charging up the device. In one embodiment, the device may be retro-fitted externally with components required for wireless charging. In another embodiment, existing circuitry present in the charging device, such as antenna, receivers, and the like, may be used to harness the power.

Figure 8:
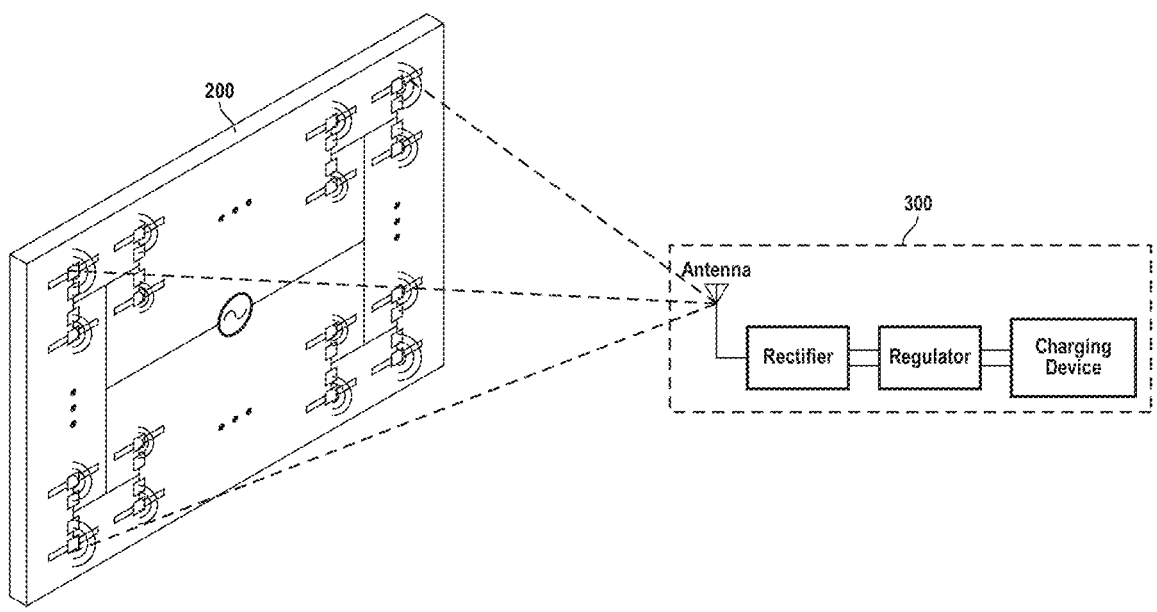
FIG. 8 is a schematic diagram of an RF lens wirelessly charging a device, in accordance with one exemplary embodiment of the present invention.
Figure 9:
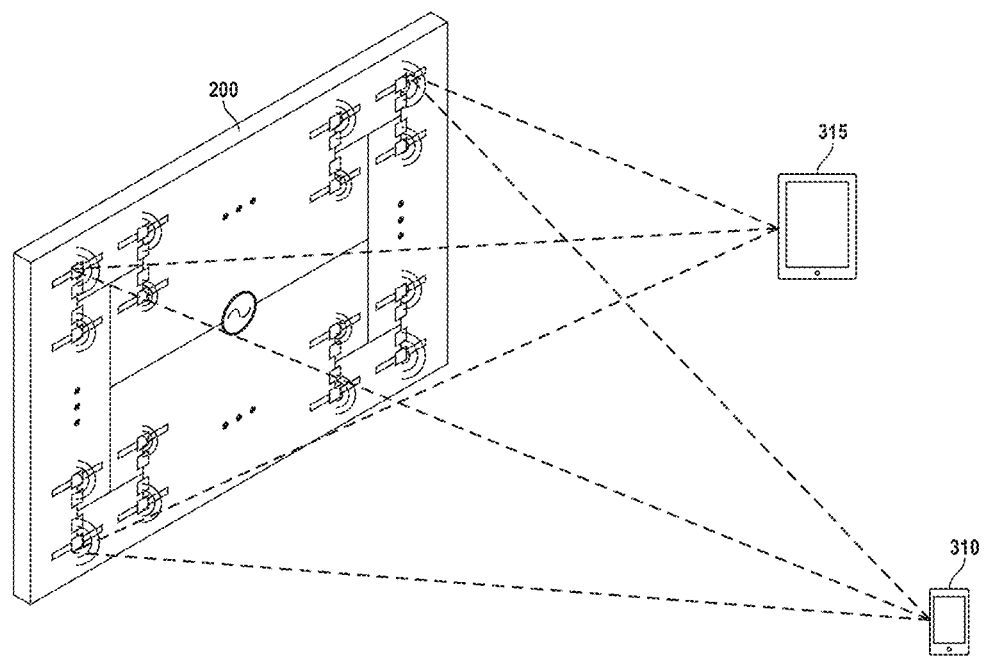
FIG. 9 is a schematic diagram of an RF lens concurrently charging a pair of devices, in accordance with one exemplary embodiment of the present invention.
Figure 10:
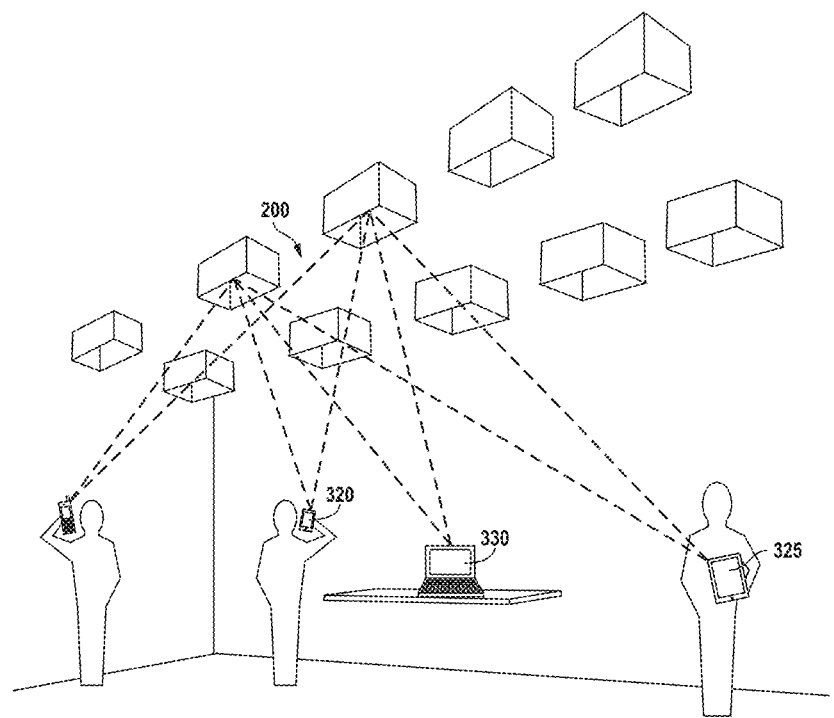
FIG. 10 is a schematic diagram of an RF lens concurrently charging a pair of mobile devices and a stationary device, in accordance with one exemplary embodiment of the present invention.

FIG. 8 is a schematic diagram of RF lens 200 wirelessly charging device 300. In some embodiments, RF lens 200 wirelessly charges multiple devices concurrently. FIG. 9 shows RF lens 200 concurrently charging devices 310, and 315 using focused waves of similar or different strengths. FIG. 10 shows RF lens 200 wireless charging mobile devices 320, 325 and stationary device 330 all of which are assumed to be indoor.

Figure 11A:
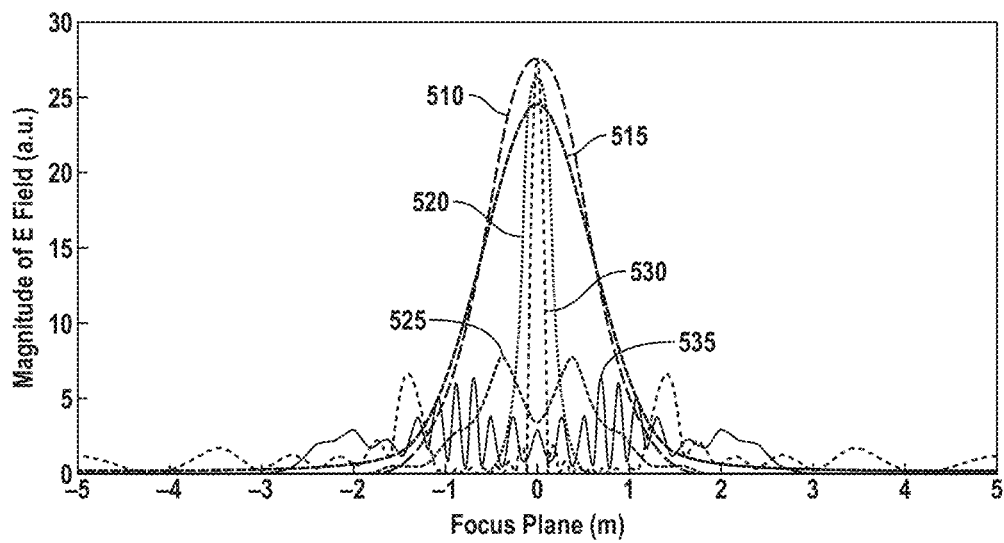
FIG. 11A shows computer simulations of the electromagnetic field profiles of a one-dimensional RF lens, in accordance with one exemplary embodiment of the present invention.
Figure 11B:
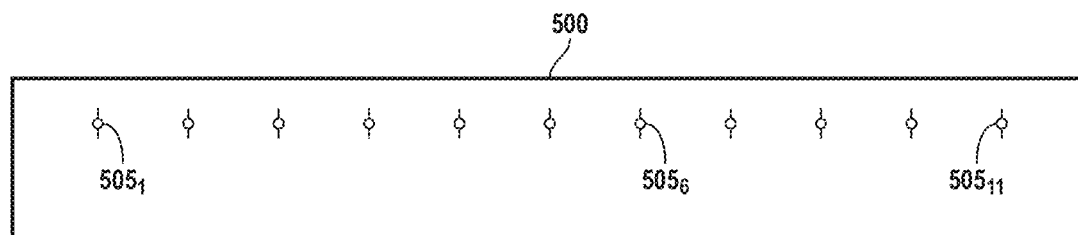
FIG. 11B is a simplified schematic view of an RF lens used in generating the electromagnetic field profiles of FIG. 11A.

FIG. 11A shows computer-simulated electromagnetic field profiles generated by a one-dimensional RF lens at a distance 2 meters away from the RF lens having an array of 11 isotropic radiators. The beam profiles are generated for three different frequencies, namely 200 MHz (wavelength 150 cm), 800 MHz (wavelength 37.5 cm), and 2400 MHz (wavelength 12.50 cm). Since the distance between each pair of adjacent radiators of the RF lens is assumed to be 20 cm, the RF lens has an aperture of 2 m. Therefore, the wavelengths are of the order of aperture size and focal length of the radiator. FIG. 11B is a simplified schematic view of such an RF lens 500 having 11 radiators $505_k$ that are spaced 20 cm apart from one another, where K is an integer ranging from 1 to 11.

Plots 510, 520 and 530 are computer simulations of the electromagnetic field profiles respectively for 200 MHz, 800 MHz, and 2400 signals radiated by radiator 500 when the relative phases of the various radiators are selected so as to account for the path differences from each of radiators $505_k$ to the point located 2 meters away from radiator $505_6$ in accordance with expression (1) above. For each of these profiles, the diffraction limited focus size is of the order of the wavelengths of the radiated signal. Plots 515, 525 and 535 are computer simulations of the electromagnetic field profiles at a distance 2 meters away from the radiator array for 200 MHz, 800 MHz, and 2400 signals respectively when the phases of radiators $505_k$ were set equal to one another.

As seen from these profiles, for the larger wavelength having a frequency of 200 MHz (i.e, plots 510, 515), because the path differences from the individual radiators to the focus point are not substantially different, the difference between profiles 510 and 515 is relatively unpronounced. However, for each of 800 MHz and 2400 MHz frequencies, the EM confinement (focus) is substantially more when the relative phases of the various radiators are selected so as to account for the path differences from the radiators $505_k$ to the focus point than when radiator phases are set equal to one another. Although the above examples are provided with reference to operating frequencies of 200 MHz, 800 MHz, and 2400 MHz, it is understood that the embodiments of the present may be used in any other operating frequency, such as 5.8 GHz, 10 GHz, and 24 GHz.

Figure 12:
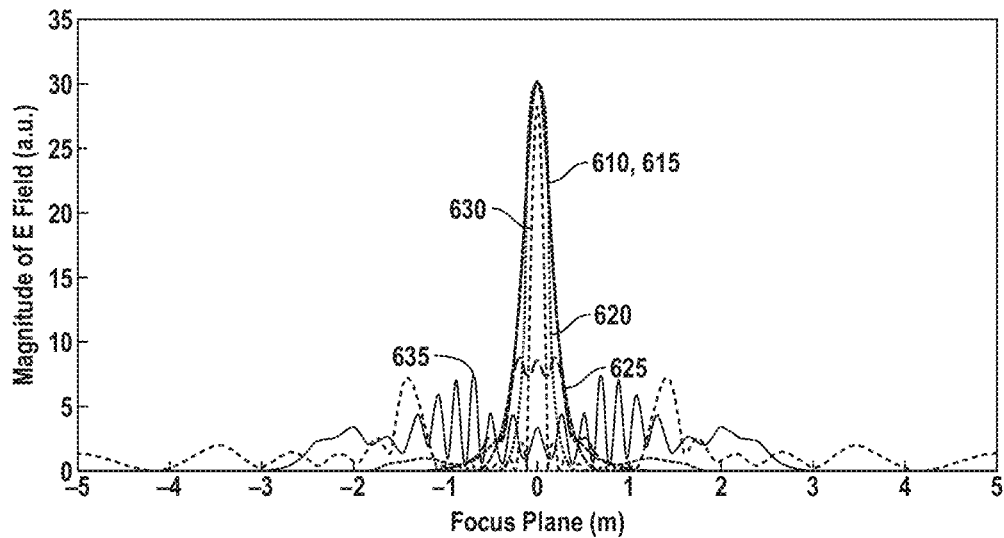
FIG. 12 shows the variations in computer simulated electromagnetic field profiles generated by the RF lens of FIG. 11B as a function of the spacing between each adjacent pair of radiators disposed therein.

FIG. 12 shows the variations in computer simulated electromagnetic field profiles generated by RF lens 500—at a distance of 2 meters away from the RF lens—as a function of the spacing between each adjacent pair of radiators. The RF lens is assumed to operate at a frequency of 2400 MHz. Plots 610, 620, and 630 are computer simulations of the field profiles generated respectively for radiator spacings of 5 cm, 10 cm, and 20 cm after selecting the relative phases of the various radiators to account for the path differences from various radiators $505_k$ to the point 2 meters away from the RF lens, in accordance with expression (1) above. Plots 615, 625, and 650 are computer simulations of the field profiles generated respectively for radiator spacings of 5 cm, 10 cm, and 20 cm assuming all radiators disposed in RF lens 500 have equal phases. As is seen from these plots, as the distance between the radiators increases—thus resulting in a larger aperture size—the EM confinement also increases thereby resulting in a smaller focus point.

Figure 13A:
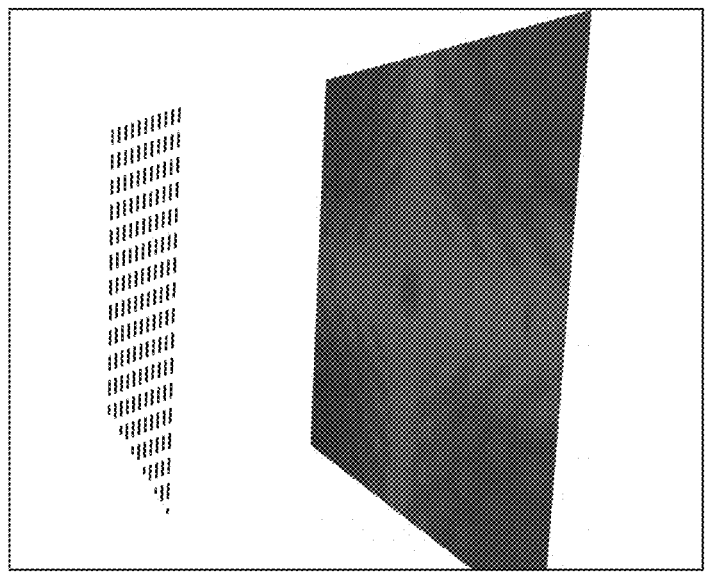
FIG. 13A is an exemplary computer-simulated electromagnetic field profile of an RF lens and using a scale of −15 dB to 0 dB, in accordance with one exemplary embodiment of the present invention.
Figure 13B:
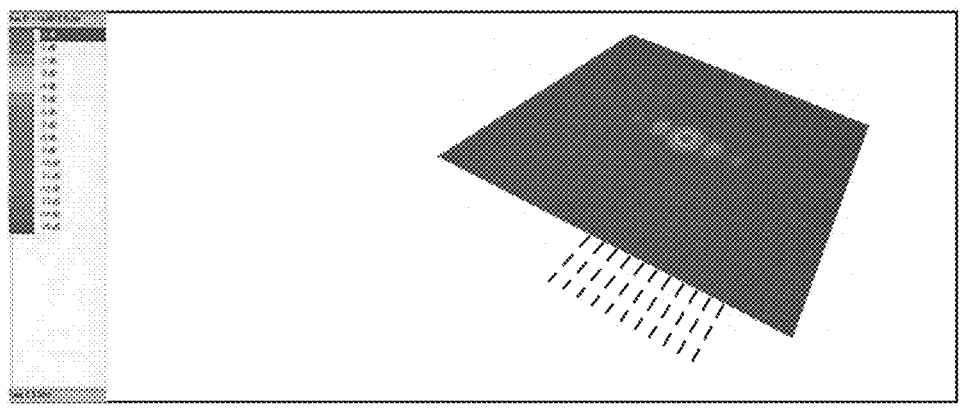
FIG. 13B shows the computer-simulated electromagnetic field profile of FIG. 13A using a scale of −45 dB to 0 dB.

FIG. 13A is the computer simulation of the EM profile of an RF lens at a distance 3 meters away from an RF lens having disposed therein a two-dimensional array of Hertzian dipoles operating at a frequency of 900 MHz, such as RF lens 200 shown in FIG. 5. The spacing between the dipole radiators are assumed to be 30 cm. The relative phases of the radiators were selected so as to account for the path differences from the radiators to the focal point, assumed to be located 3 meters away from the RF lens. In other words, the relative phases of the radiators is selected to provide the RF lens with a focal length of approximately 3 meters. The scale used in generating FIG. 13A is −15 dB to 0 dB. FIG. 13B shows the EM profile of FIG. 13A using a scale of −45 dB to 0 dB.

Figure 14A:
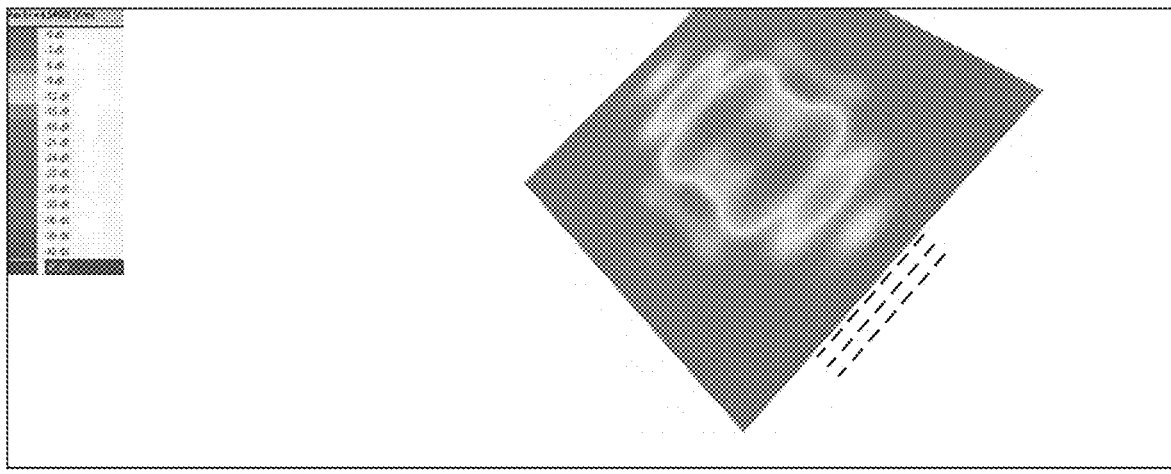
FIG. 14A is an exemplary computer-simulated electromagnetic field profile of the RF lens of FIG. 13A and using a scale of −15 dB to 0 dB, in accordance with one exemplary embodiment of the present invention.
Figure 14B:
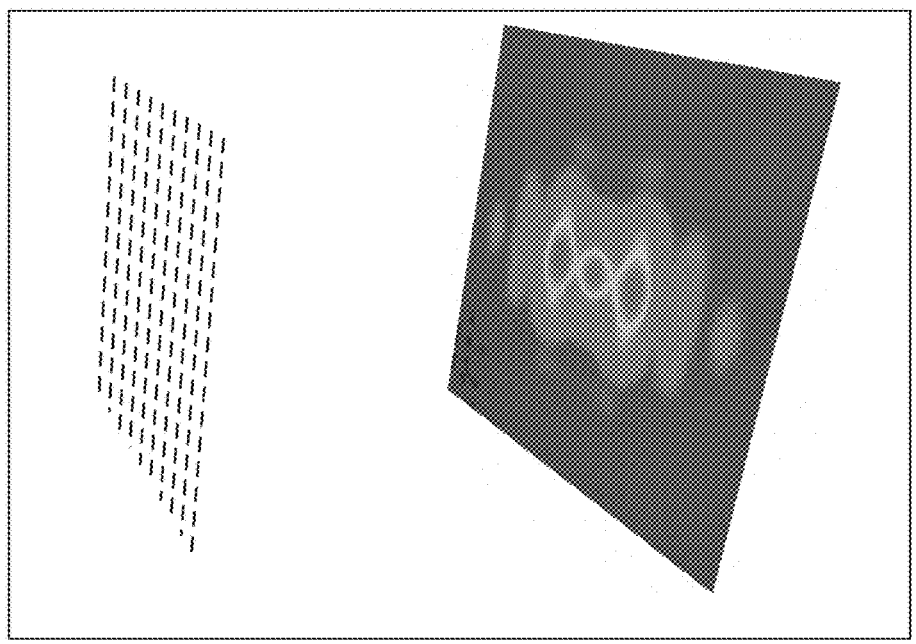
FIG. 14B shows the computer-simulated electromagnetic field profile of FIG. 14A using a scale of −45 dB to 0 dB, in accordance with one exemplary embodiment of the present invention.

FIG. 14A is the computer simulation of the EM profile of the RF lens of FIGS. 13A/13B at a distance 2 meters away from the focal point, i.e., 5 meters away from the RF lens. As is seen from FIG. 14A, the radiated power is diffused over a larger area compared to those shown in FIGS. 13A and 13B. The scale used in generating FIG. 14A is −15 dB to 0 dB. FIG. 14B shows the EM profile of FIG. 14A using a scale of −45 dB to 0 dB.

Figure 15A:
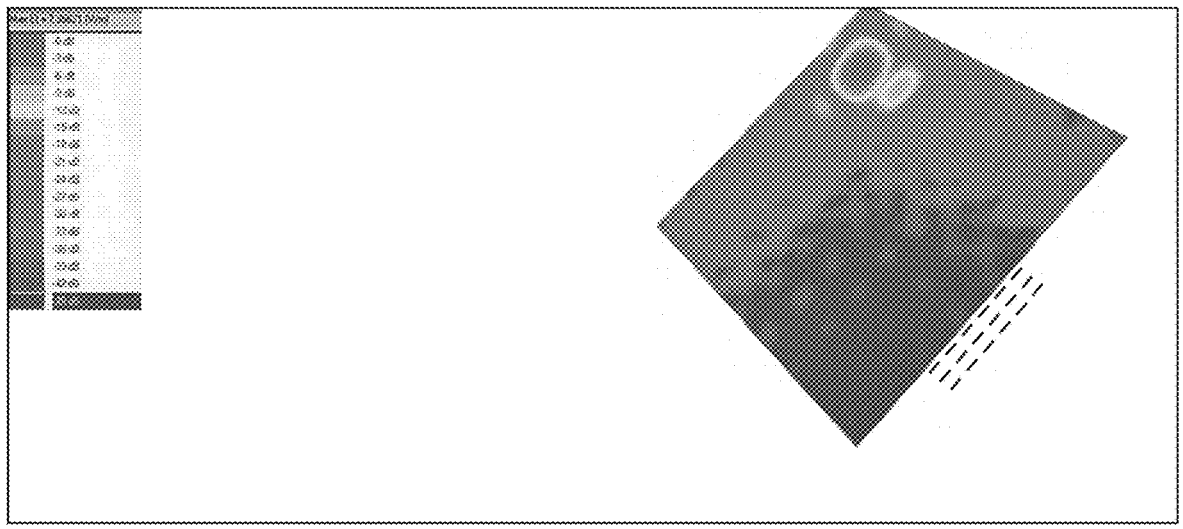
FIG. 15A is an exemplary computer-simulated electromagnetic field profile of an RF lens and using a scale of −15 dB to 0 dB, in accordance with one exemplary embodiment of the present invention.
Figure 15B:
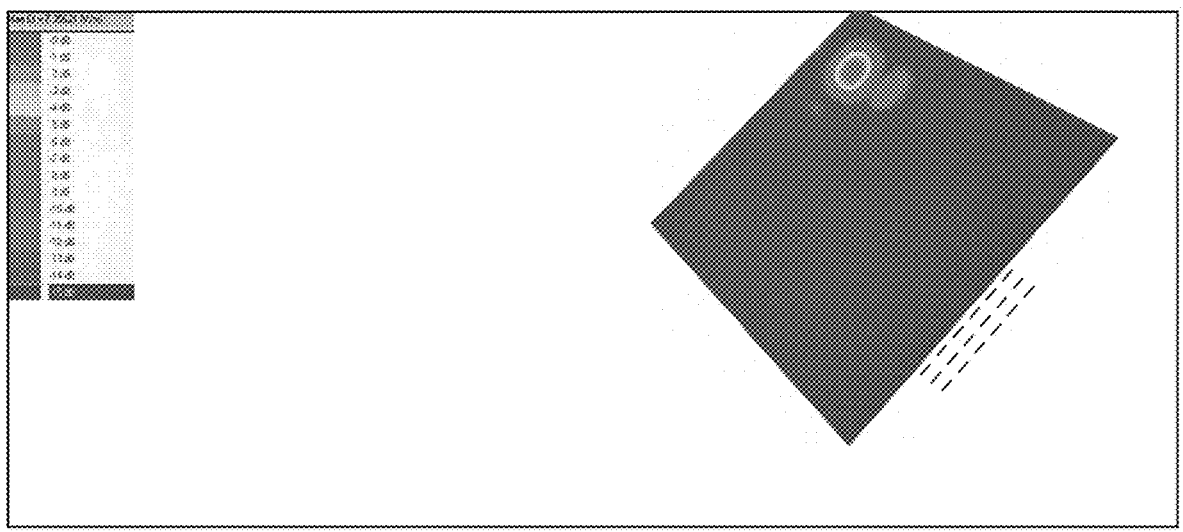
FIG. 15B shows the computer-simulated electromagnetic field profile of FIG. 15A using a scale of −45 dB to 0 dB, in accordance with one exemplary embodiment of the present invention.

FIG. 15A is the computer simulation of the EM profile of an RF lens at a distance 3 meters away from the RF lens having disposed therein a two-dimensional array of Hertzian dipoles operating at a frequency of 900 MHz. The spacing between the dipole radiators are assumed to be 30 cm. The relative phases of the radiators are selected so as to account for the path differences from the radiators to the focal point, assumed to be located 3 meters away from the RF lens and at an offset of 1.5 m from the focal plane of the RF lens, i.e., the focus point has a y-coordinate of 1.5 meters from the focal plane (see FIG. 4). The scale used in generating FIG. 15A is −15 dB to 0. FIG. 15B shows the EM profile of FIG. 15A using a scale of −45 dB to 0 dB.

Figure 16A:
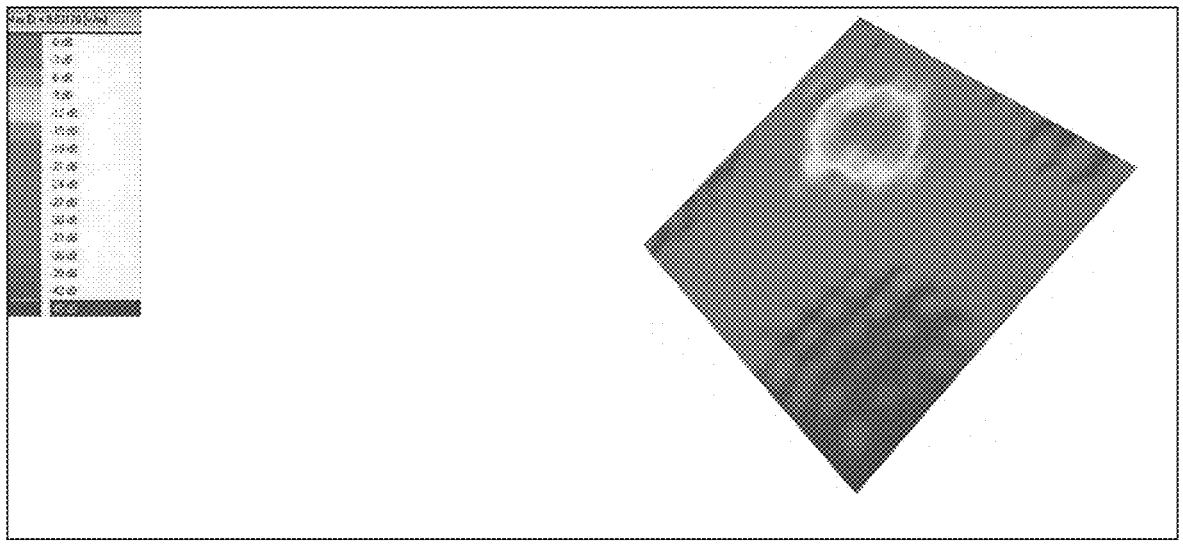
FIG. 16A is an exemplary computer-simulated electromagnetic field profile of the RF lens of FIG. 15A using a scale of −15 dB to 0 dB, in accordance with one exemplary embodiment of the present invention.
Figure 16B:
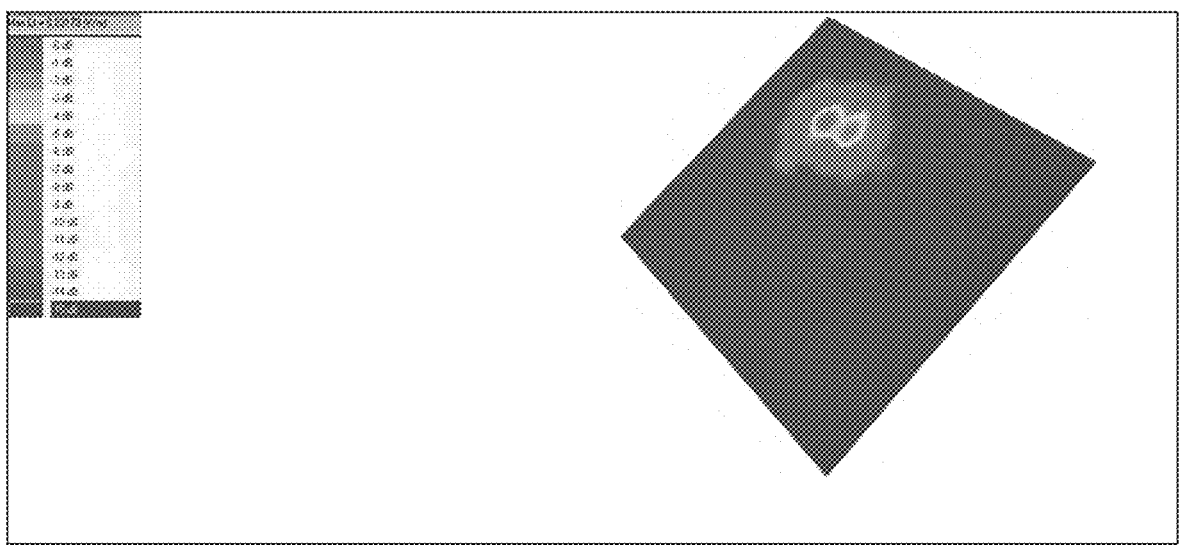
FIG. 16B shows the computer-simulated electromagnetic field profile of FIG. 16A using a scale of −45 dB to 0 dB, in accordance with one exemplary embodiment of the present invention.

FIG. 16A is the computer simulation of the EM profile of the RF lens of FIGS. 15A/15B at a distance 2 meters away from the focal point, i.e., 5 meters away from the x-y plane of the RF lens. As is seen from FIG. 16A, the radiated power is diffused over a larger area compared to that shown in FIG. 15A. The scale used in generating FIG. 16A is −15 dB to 0 dB. FIG. 16B shows the EM profile of FIG. 16A using a scale of −45 dB to 0 dB. The EM profiles shown in FIGS. 13A, 13B, 14A, 14B, 15A, 15B, 16A, 16B demonstrate the versatility of an RF lens, in accordance with the present invention, in focusing power at any arbitrary point in 3D space.

Figure 17A:
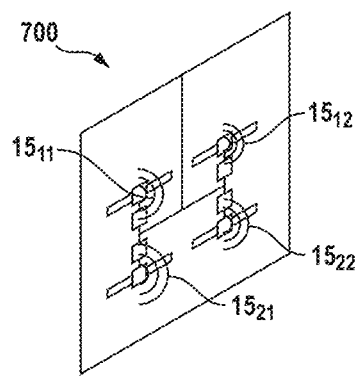
FIG. 17A shows an exemplary radiator tile having disposed therein four radiators, in accordance with one exemplary embodiment of the present invention.
Figure 17B:
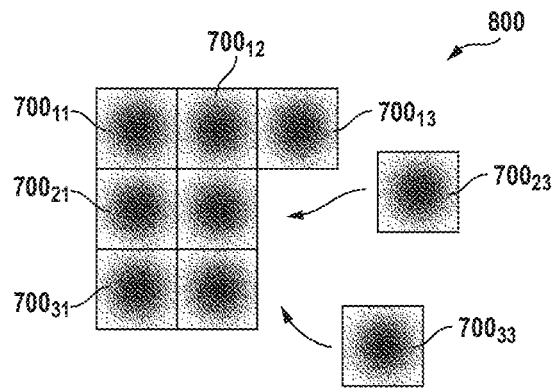
FIG. 17B shows an RF lens formed using a multitude of the radiator tiles of FIG. 17A, in accordance with one exemplary embodiment of the present invention.

In accordance with one aspect of the present invention, the size of the array forming an RF lens is configurable and may be varied by using radiator tiles each of which may include one or more radiators. FIG. 17A shows an example of a radiator tile 700 having disposed therein four radiators $15_{11}$, $15_{12}$, $15_{21}$, and $15_{22}$. Although radiator tile 700 is shown as including four radiators, it is understood that a radiator tile, in accordance with one aspect of the present invention, may have fewer (e.g., one) or more than (e.g., 6) four radiators. FIG. 17B shown an RF lens 800 initially formed using 7 radiator tiles, namely radiator tiles $700_{11}$, $700_{12}$, $700_{13}$, $700_{21}$, $700_{22}$, $700_{31}$, $700_{31}$—each of which is similar to radiator tile 700 shown in FIG. 17A—and being provided with two more radiator tiles $700_{23}$ and $700_{33}$. Although not shown, it is understood that each radiator tile includes the electrical connections necessary to supply power to the radiators and deliver information from the radiators as necessary. In one embodiment, the radiators formed in the tiles are similar to radiator 202 shown in FIG. 6.

In accordance with one aspect of the present invention, the RF lens is adapted to track the position of a mobile device in order to continue the charging process as the mobile device changes position. To achieve this, in one embodiment, a subset or all of the radiators forming the RF lens include a receiver. The device being charged also includes a transmitter adapted to radiate a continuous signal during the tracking phase. By detecting the relative differences between the phases (arrival times) of such a signal by at least three different receivers formed on the RF lens, the position of the charging device is tracked.

Figure 18:
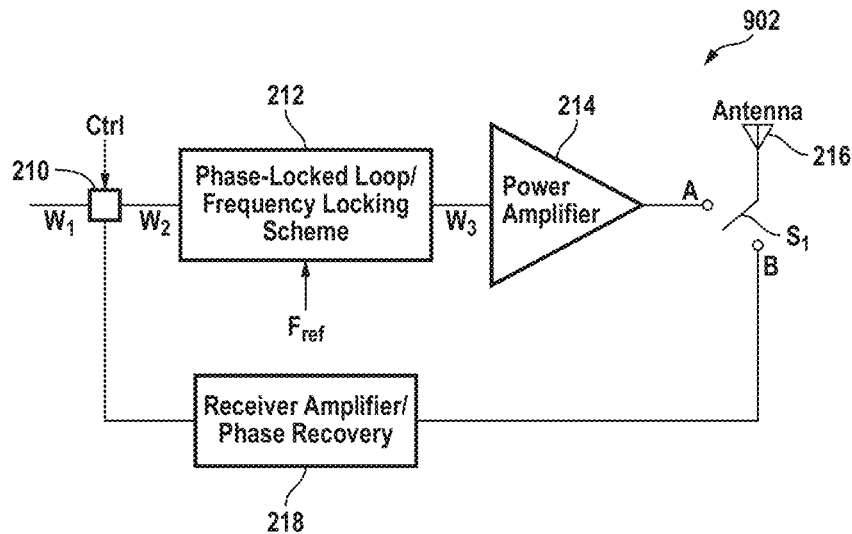
FIG. 18 is a simplified block diagram of a radiator disposed in an RF lens, in accordance with another exemplary embodiment of the present invention.

FIG. 18 is a simplified block diagram of a radiator 902 disposed in an RF lens, such as RF lens 200 shown in FIG. 5, in accordance with one embodiment of the present invention. Radiator 902 is similar to radiator 202 shown in FIG. 6, except that radiator 902 has a receiver amplifier and phase recovery circuit 218, and a switch $S_1$. During power transfer, switch $S_1$ couples antenna 216 via node A to power amplifier 214 disposed in the transmit path. During tracking, switch $S_1$ couples antenna 216 via node B to receiver amplifier and phase recovery circuit 218 disposed in the receive path to receive the signal transmitted by the device being charged.

Figure 19:
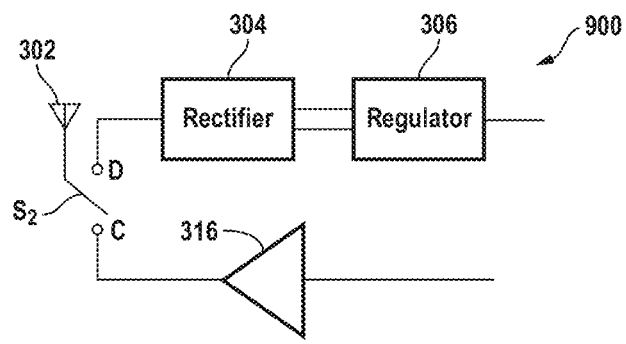
FIG. 19 shows a number of electronic components disposed in a device adapted to be charged wirelessly, in accordance with another exemplary embodiment of the present invention.
Figure 20:
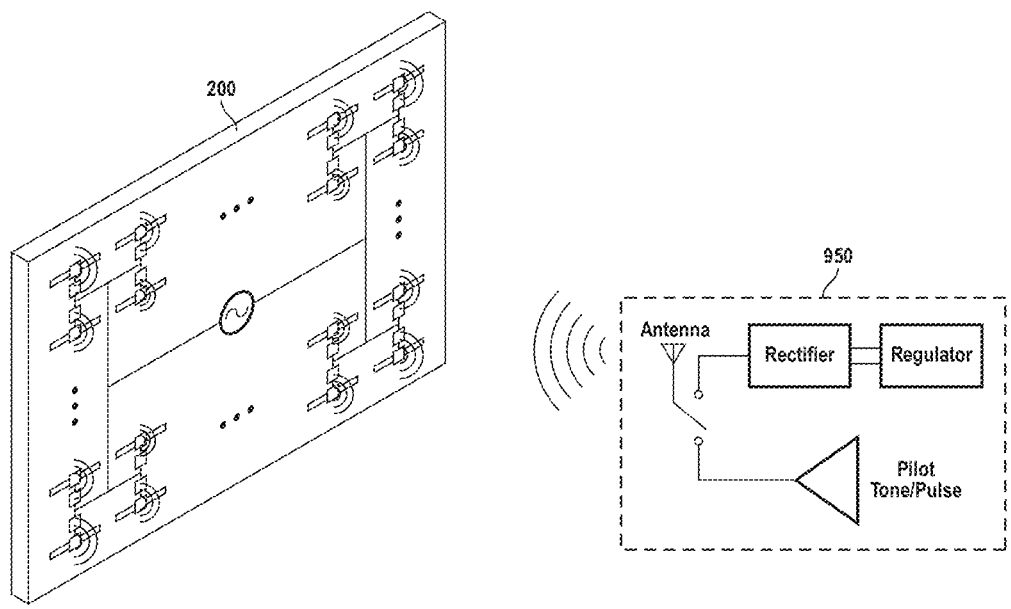
FIG. 20 shows an RF lens tracking a device using a signal transmitted by the device, in accordance with another exemplary embodiment of the present invention.

FIG. 19 shows a number of components of a device 900 adapted to be charged wirelessly, in accordance with one embodiment of the present invention. Device 900 is similar to device 300 shown in FIG. 7, except that device 900 has a transmit amplifier 316, and a switch $S_2$. During power transfer, switch $S_2$ couples antenna 302 via node D to rectifier 304 disposed in receive path. During tracking, switch $S_2$ couples antenna 302 via node C to transmit amplifier 316 to enable the transmission of a signal subsequently used by the RF lens to detect the position of device 300. FIG. 20 shows RF lens 200 tracking device 900 by receiving the signal transmitted by device 900.

In accordance with another embodiment of the present invention, a pulse based measurement technique is used to track the position of the mobile device. To achieve this, one or more radiators forming the RF lens transmit a pulse during the tracking phase. Upon receiving the pulse, the device being tracked sends a response which is received by the radiators disposed in the array. The travel time of the pulse from the RF lens to the device being tracked together with the travel times of the response pulse from the device being tracked to the RF lens is representative of the position of the device being tracked. In the presence of scatterers, the position of the device could be tracked using such estimation algorithms as maximum likelihood, or least-square, Kalman filtering, a combination of these techniques, or the like. The position of the device may also be determined and tracked using WiFi and GPS signals.

Figure 21:
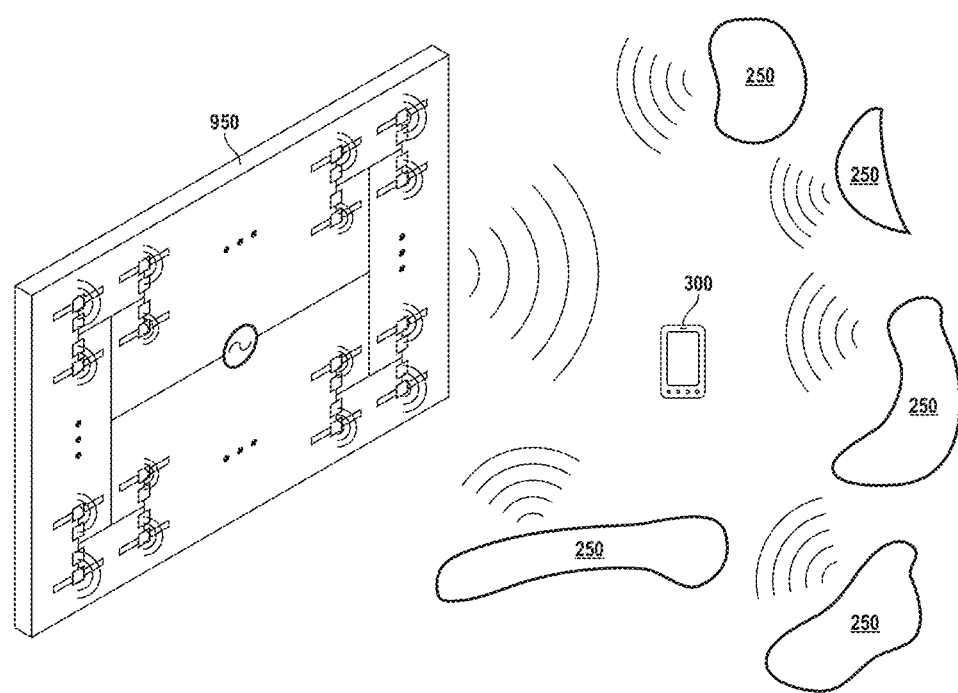
FIG. 21 shows an RF lens transferring power to a device in the presence of a multitude of scattering objects, in accordance with another exemplary embodiment of the present invention.

The presence of scattering objects, reflectors and absorbers may affect the RF lens' ability to focus the beam efficiently on the device undergoing wireless charging. For example, FIG. 21 shows an RF lens 950 transferring power to device 300 in the presence of a multitude of scattering objects 250. To minimize such effects, the amplitude and phase of the individual radiators of the array may be varied to increase power transfer efficiency. Any one of a number of techniques may be used to vary the amplitude or phase of the individual radiators.

In accordance with one such technique, to minimize the effect of scattering, a signal is transmitted by one or more of the radiators disposed in the RF lens. The signal(s) radiated from the RF lens is scattered by the scattering objects and received by the radiators (see FIG. 18). An inverse scattering algorithm is then used to construct the scattering behavior of the environment. Such a construction may be performed periodically to account for any changes that may occur with time. In accordance with another technique, a portion or the entire radiator array may be used to electronically beam-scan the surroundings to construct the scattering behavior from the received waves. In accordance with yet another technique, the device undergoing wireless charging is adapted to periodically send information about the power it receives to the radiator. An optimization algorithm then uses the received information to account for scattering so as to maximize the power transfer efficiency.

In some embodiments, the amplitude/phase of the radiators or the orientation of the RF lens may be adjusted to take advantage of the scattering media. This enable the scattering objects to have the proper phase, amplitude and polarization in order to be used as secondary sources of radiation directing their power towards the device to increase the power transfer efficiency.

The above embodiments of the present invention are illustrative and not limitative. Embodiments of the present invention are not limited by number of radiators disposed in an RF lens, nor are they limited by the number of dimensions of an array used in forming the RF lens. Embodiments of the present invention are not limited by the type of radiator, its frequency of operation, and the like. Embodiments of the present invention are not limited by the type of device that may be wirelessly charged. Embodiments of the present invention are not limited by the type of substrate, semiconductor, flexible or otherwise, in which various components of the radiator may be formed. Other additions, subtractions or modifications are obvious in view of the present disclosure and are intended to fall within the scope of the appended claims.

What is claimed is:

1. A wireless charger comprising:
    a first tile comprising a first plurality of radiators configured to radiate radio frequency (RF) electromagnetic waves; and
    a second tile comprising a second plurality of radiators configured to radiate RF electromagnetic waves, wherein said first and second tiles are adapted to be positioned directly next to one another so as to operate in concert and wirelessly power a first device positioned away from the wireless charger, said wireless charger forming an RF lens.

2. The wireless charger of claim 1 wherein the first tile is adapted to charge a second device concurrently with the first device.

3. The wireless charger of claim 1 wherein said first tile, said second tile, and said first device are positioned indoor.

4. The wireless charger of claim 1 wherein said first device is retro-fitted externally with components to receive the electromagnetic waves.

5. The wireless charger of claim 1 further comprising third and fourth tiles each comprising a plurality of radiators adapted to radiate RF electromagnetic waves to power the first device, wherein said first, second, third and fourth tiles form a one dimensional array of tiles.

6. The wireless charger of claim 1 further comprising third and fourth tiles each comprising a plurality of radiators adapted to radiate RF electromagnetic waves to power the first device, wherein said first, second, third and fourth tiles form a two dimensional array of tiles.

7. The wireless charger of claim 5 wherein said first, second, third and fourth tiles are in electrical communication with one another.

8. The wireless charger of claim 1 wherein said first tile comprises a first plurality of locked-loop circuits each associated with a different one of the first plurality of radiators, and said second tile comprises a second plurality of locked-loop circuits each associated with a different one of the second plurality of radiators, wherein said first and second plurality of locked-loop circuits are locked to a same reference signal.

9. The wireless charger of claim 1 wherein each of said first and second plurality of radiators comprises a receiver to receive a signal transmitted by the first device.

10. The wireless charger of claim 1 wherein each of said first and second tiles comprises one or more receivers configured to receive a signal transmitted by the first device.

11. The wireless charger of claim 10 wherein said first and second tiles are configured to track a position of the first device using the signal transmitted by the first device.

12. The wireless charger of claim 1 wherein said wireless charger comprises a control circuit configured to dynamically change phases of the electromagnetic waves generated by the first and second plurality of radiators in response to movements by the first device.

13. The wireless charger of claim 1 wherein a frequency of the RF electromagnetic waves radiated by the first and second plurality of radiators is selected from a group consisting of 5.8 GHz, 10 GHz, and 24 GHz.

14. The wireless charger of claim 1 wherein a wavelength of the RF electromagnetic waves radiated by the first and second plurality of radiators is in mm-wave band.

15. The wireless charger of claim 8 wherein a frequency of the RF electromagnetic waves radiated by the first and second plurality of radiators is different from a frequency of the reference signal.

16. The wireless charger of claim 1 wherein each of the first and second plurality of radiators comprises a programmable delay element.

17. The wireless charger of claim 11 wherein the position of the first device is tracked in accordance with an estimation algorithm.

18. The wireless charger of claim 11 wherein the position of the first device is tracked in accordance with a travel time of the RF electromagnetic waves transmitted from the wireless charger to the first device and a travel time of a response signal transmitted by the first device.

19. The wireless charger of claim 11 wherein the position of the first device is tracked using a signal selected from a group consisting of WiFi and GPS signals.

20. The wireless charger of claim 8 wherein phases of the first and second plurality of locked-loop circuits are further selected to enable RF electromagnetic waves scattered off objects to power the first device.

21. The wireless charger of claim 10 wherein the signal transmitted by the first device includes data representative of a power received by the first device.

22. The wireless charger of claim 8 wherein each of said first and second plurality of locked-loop circuits is configured to vary a phase of the RF electromagnetic wave transmitted by an associated radiator.

23. The wireless charger of claim 8 wherein each of said first and second plurality of locked-loop circuits is configured to vary an amplitude of the RF electromagnetic wave transmitted by an associated radiator.

24. The wireless charger of claim 8 wherein each of said first and second plurality of locked-loop circuits is configured to vary a frequency of the RF electromagnetic wave transmitted by an associated radiator.

25. The wireless charger of claim 8 wherein each of said first and second plurality of locked-loop circuits is configured to vary a polarization of the RF electromagnetic wave transmitted by an associated radiator.

26. The wireless charger of claim 9 wherein each receiver is configured to receive RF electromagnetic waves reflected off objects due to scattering.

* * * * *